United States Patent [19]

Koppers et al.

[11] Patent Number: 4,744,275
[45] Date of Patent: May 17, 1988

[54] METHOD OF AND APPARATUS FOR PROCESSING STRIP

[75] Inventors: Hermann Koppers, Duisburg; Herbert Lux, Mühlheim/Ruhr; Heinz-Wilhelm Berger, Neukirchen-Vluyn; Dieter Baukloh, Duisburg; Dieter Hohl, Neukirchen-Vluyn, all of Fed. Rep. of Germany

[73] Assignee: BWG Bergwerk-und Walzwerk-Maschinenbaum GmbH, Duisburg, Fed. Rep. of Germany

[21] Appl. No.: 910,735

[22] Filed: Sep. 23, 1986

[30] Foreign Application Priority Data

Sep. 28, 1985 [DE] Fed. Rep. of Germany ....... 3534622

[51] Int. Cl.[4] .............................................. B23D 31/00
[52] U.S. Cl. ......................................... 83/44; 83/408; 83/365
[58] Field of Search ................... 83/44, 43, 45, 47, 33, 83/408, 279, 404, 407, 418, 420, 425.2, 437, 449, 365, 368

[56] References Cited

U.S. PATENT DOCUMENTS

| 1,798,017 | 3/1931 | Free | 83/44 |
| 3,185,006 | 5/1965 | Mercer et al. | 83/408 X |

Primary Examiner—Donald R. Schran
Attorney, Agent, or Firm—Karl F. Ross; Herbert Dubno

[57] ABSTRACT

The method and apparatus provide for transversely separating and laterally trimming or finishing continuously passing strips in processing lines for strip material, such as metallic strip. The strip is first severed in transverse direction and immediately thereafter is trimmed at the sides thereof. The time required for adjusting the lateral shears is approximately equal to that of the coil exchange operation leading to the time gained, and stoppages of strip in the operating stages are precluded.

2 Claims, 2 Drawing Sheets

METHOD OF AND APPARATUS FOR PROCESSING STRIP

FIELD OF THE INVENTION

Our present invention relates to a method of and apparatus for processing strip, especially a metal strip.

BACKGROUND OF THE INVENTION

Since, in the processing of strip, lengths of different width may be joined together, it is known to sever such strip transverse to its length, i.e. to establish the finished length of strip or to effect such separation. The strip can also be trimmed, i.e. cut or slit in the longitudinal direction for finishing the lateral edges thereof and establishing the desired width thereof. The method and apparatus are particularly applicable to metallic strips, and substantially continuous strip treatments.

For example, in continuous treatment operations or processing lines for metallic strip, e.g. in pickling operations, annealing lines, coating operations and the like, the velocity of strip must be adapted to the particular process conditions for a given result. It is usually also desirable to maintain a constant velocity for the processing operations or unit operations thereof.

Accordingly, each part of the respective treatment line is customarily preceded by an inlet storage device. It can also be associated with an exit storage device. The storage devices serve to provide take-up capacity at the inlet and outlet members in response to the periods of interruption of advance of the strip as can arise, for example, during endwise joining of strip, or during severing or similarly slitting or cutting of the strip. Without such storage units, the line can generally not achieve a substantially constant velocity or interrupted operation in the parts between the storage units.

The strip is usually cut to the desired or finished length at the respective exit or outlet member, and this can be accompanied by lateral slitting (trimming) of the longitudinal edges of the strip to attain the desired width thereof.

The finished length of a strip can be obtained by way of a transverse shear or similar cutter wherein the blade or knife is disposed perpendicularly with respect to the longitudinal extent of the strip. The lateral slitting, to form the finished lateral edges, is done, in turn, with a device having adjustable knives or shears, which can be respectively brought into the operating position on each side of the strip and by means of which the ultimately desired width of the strip can be produced. Usually, the clippings or scraps obtained during the trimming of the edges are further handled by coilers or choppers.

In known lines of this type, the device for the lateral finishing or trimming of the strip is normally arranged at a distance from quite close to the transverse shear, or can be positioned more remote from the transverse shear. Because such processing lines need to process strip products with widely varying widths, it has been necessary heretofore to use a lateral stamping apparatus or like punch or press. The stamping apparatus is used to cut access openings at the joints of the continuously passing strip. The lateral slitting devices are then able to be brought into the position required at the strip when a change in the trimming width occurs.

Accordingly, each time the width of a strip is changed, by cutting off the junction between a leading length and a trailing strip or simply an operation of the lateral slitter device to allow such a change, there arises an associated period of interruption at the exit of the treating operation. During such downtime period, the following steps are carried out:

adjusting the lateral stamping apparatus to the desired strip width;

stamping respective shapes or cutouts from the strip at opposite sides thereof;

retracting the stamping apparatus on completion of the cuts;

advancing the strip until the resulting cutouts reach the lateral slitters;

adjusting the spacing of the lateral slitters;

preliminary cutting of the ne strip width;

confirming the actual cut by measurements; and readjusting the lateral slitters, in conformity with the determined dimensions, as may be required.

During this period of interruption in advance of the strip from the exit side of the processing line to the coiler, the storage unit is accumulating strip in accordance with the prevailing strip velocity in the processing line. Subsequently, the joint portion, i.e. the section of the strip at which a welded or otherwise provided connection combines two lengths of strip in endwise relationship, is advanced to the transverse shear.

The strip is then cut such that the joint portion is cut-off by the transverse shear making two separate cuts; the first to establish the end of the leading length on a previous coil, and the second to establish the forward end or leading edge of the next or trailing strip for the next coil. The cut strip is then passed over guide rollers to a coilere spool or mandrel.

The time required for replacing a coil once the transverse cuts through the metal strip have been made is generally up to about 1.5 minutes. In this period, is included the removal of the previous coil, from the coiler and connecting of the oncoming length to form the next coil. In the known assemblies comprised of lateral splitters, subsequent transverse shear, the coiler, the periods of downtime at the lateral splitters have to be added to the replacement time for the coils. This leads to the need for large storage capacity for the strip at the exit member. Furthermore, in this arrangement it is assumed that the length of the strip is sufficient so that it will be feasible, at the selected strip velocity, to fill and empty the storage component without shutting down the associated operation or unit.

However, the length of a strip with a thickness of greater than 2 mm is normally too short to accommodate the downtime in the exit member. Furthermore, the velocity of the line and the particular strip velocity can be lowered at will, due to potential damages to the strip in the particular operation. For example, in a pickling line, the strip may be subjected to excessive pickling on stopping in the solution at the pickling station, and the resultant product may not pass inspection and may be lost as reject material.

OBJECTS OF THE INVENTION

It is one object of our invention to provide a method of processing strip material in substantially continuous manner wherein the longitudinal and transverse cutting or trimming are carried out with considerable time-saving.

In accordance with another object of the invention the gain of time can be achieved at any desired change of the width of the strip.

It is also an object of the invention to provide a method, particularly for the processing of metal strip, which substantially precludes periods of interruption of treatment operations of a processing line for strip material.

It is also an object of the invention to provide a processing or trimming line for carrying out the method of the invention.

SUMMARY OF THE INVENTION

The above and other objects, features and advantages of our invention can be obtained by a method characterized in that the strip is first severed in transverse direction and immediately thereafter, but only after transverse severing, is trimmed at the sides thereof starting from the leading edge of the oncoming strip formed by the transverse cut.

These steps obviate the hitherto necessary and time-consuming lateral punching of access cutouts. Furthermore, the replacement of coils can be done while the lateral trimming shears are adjusted for a new width of the strip. Accordingly, the time-consuming functions experienced during lateral trimming and coil exchange are carried out simultaneously, or synchronized with respect to time, whereas hitherto they were carried out sequentially thereby causing excessive periods of feed interruption. Accordingly, a substantial saving in operating time can be achieved with the invention.

Additionally, when making changes to adapt to a different width of the strip, such changes can be done without difficulty, because one need only adjust the position of the shears which carry out the lateral trimming at the respective strip.

The lateral stamping or punching is no longer a requirement and, in any event, the earlier apparatus is generally not capable of immediate adaption to the change in strip width, or requires at least several stamping steps. The latter, again, leads to considerable periods of downtime.

Because of the substantial amounts of time saved with the method and apparatus of the invention, generally no stoppage of strips occur in the operational units. This is true even for rather short strip, and even short strip is passed substantially without stoppage through the operating stages or steps of the line.

Thus the overall flexibility and adaptability of the processing operations in fully automated lines are enhanced. Also, there is achieved a reduction in automatic control and adjustment steps and equipment. Particularly sensitive and error-prone steps can be avoided, which have caused considerable considerable damage when errors occurred previously and the losses experienced in the past, are reduced accordingly.

In accordance with another embodiment of the invention, the strip, upon being transversely cut to finish its forward or leading edge of end, is trimmed at the lateral edges after being centered in a centering station with reference to its longitudinal centerline, commencing at the forward or leading edge. Accordingly, the lateral cutters or shears can be applied immediately at the leading edge, and they can carry out the trimming in fully frontal manner into and from this edge or end.

Surprisingly, it was found that even when working on thin strip no deformations are experienced when commencing trimming along the sides, as are caused by bunching of strip, undesired coiling, or waves and like behavior. Rather, despite the flexibility of thicker and thinner metal strip, once can achieve an accurate trimming of the strip.

The scope of this invention also includes the treatment line for carrying out the method of the indicated in the foregoing. Such operating line includes a transverse shear and a trimming device having adjustable shears on each side of the passing strip for finishing the edges, by cutting or slitting the strip to the desired width. The equipment is characterized by a very simple and functionally accurate design.

The processing line is characterized in that the trimming device, when considered in the direction of travel of the strip, is arranged immediately behind the transverse shear, but still in front of the coiling spool.

In this disclosure, terms such as "immediately behind the transverse shear", is intended to mean that between the transverse shear and the edge-trimming device, no other processing is done excepting possible adjustment or control operations.

Thus it may be preferred to provide a strip-guide table with a guide station or stations before the transverse shear and/or between the transverse shear and the trimming device.

The centering station serves to maintain or orient, as required, the centerline of the strip, i.e. the strip itself, on its true and accurate course.

DESCRIPTION OF THE DRAWING

The above and other features objects, features and advantages will become more readily apparent from the following description, reference being made to the accompanying drawing in which.

SPECIFIC DESCRIPTION

Figure 1:
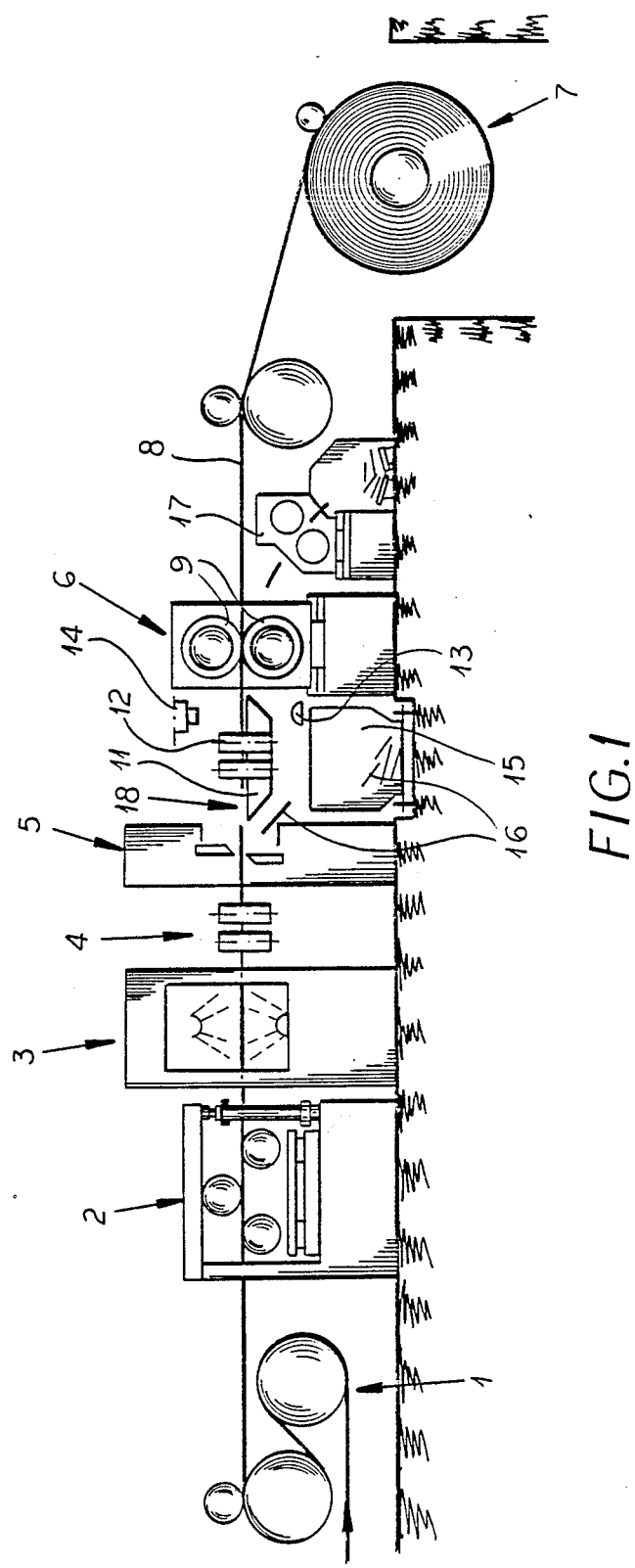
FIG. 1 is a schematic representation showing in side elevation a processing line with trimming according to the invention.

The exit terminal or member of the embodiment of the trimming line or finishing line outlined in the drawing includes a set of tensioning rolls 1, and a set of three rolls 2 which guide the strip 8 into the pickling spray station 3.

A mechanical centering device 4 serves to control the central alignment, or the accurately centered path of the strip 8 with respect to its centerline. The centering device 4 is followed by a transverse shear 5 or similar cutter which can cut the strip 8 in the direction transverse to its travel, e.g. perpendicularly with respect to its longitudinal center or centerline.

Figure 2:
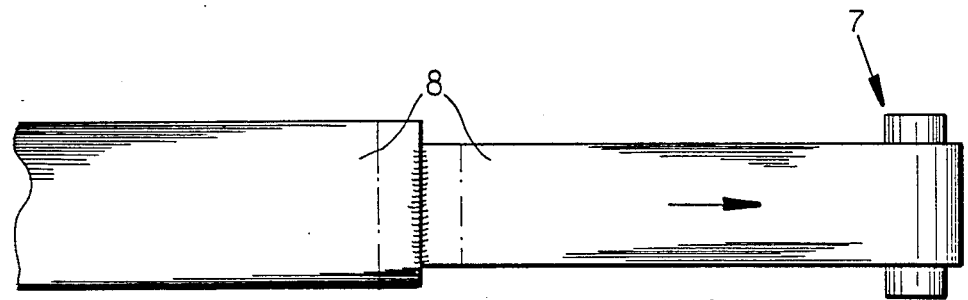
FIG. 2 is a top plan view of the joint portion of two strips with dissimilar widths.

With respect to cutting or shaping, immediately behind the transverse shear 5, there is provided a trimming device 6 which includes lateral trimming shears or similar cutters 9 on either side of the strip 8 to trim or finish each longitudinal edge of the strip 8. The shears 9 are powered by servomotor drives 10 (FIG. 2).

Thus, when considered in the direction of travel of the strip 8, the trimming device 6 is positioned between the transverse shear 5, i.e. the device which serves to provide the finished length of the strip 8, and in front of the coil spool 7 of the exit member. With respect to cutting, the trimming device 6 is directly supplied with strip 8 from the transverse shear 5.

With respect to orientation or path control, between the transverse shear 5 and the trimming device 6 there is arranged a guide table 11 having a strip centering station 12, comprised of four guide rollers, or like elements. This station 12 will ensure proper alignment of the center of the strip 8, i.e. the strip per se, with respect to the trimming shears 9.

Adjustment of the trimming shears 9, one on each side of the strip 8, to attain the desired width of the strip, is done by way of servomotors or actuators which, in turn, are controlled by the light emitter 13 and the photocells 14 (FIG. 1).

Furthermore, room is provided for a scrap cart 15 between the transverse shear 5 and the trimming device 6. The cart or wagon 15 can receive the scrap sections obtained when cutting the joints or temporary connections between two lengths of strip. These joints, which are cut off as scrap, may be made by welding, for example, and they are generally identified by reference numeral 16, see particularly FIG. 3.

Next to the trimming device 6 there is also provided a scrap shear or chopper 17 for cutting the scrap strip into smaller pieces.

The method and processing line according to the invention include the following steps: (a) transverse cutting to obtain the finished leading edge of the strip 8, see reference numeral 19 in FIG. 4. Next, and immediately thereafter, is (b) trimming of the lateral sides or edges of the strip 8 to produce the finished lateral edges of the strip 8.

Figure 3:
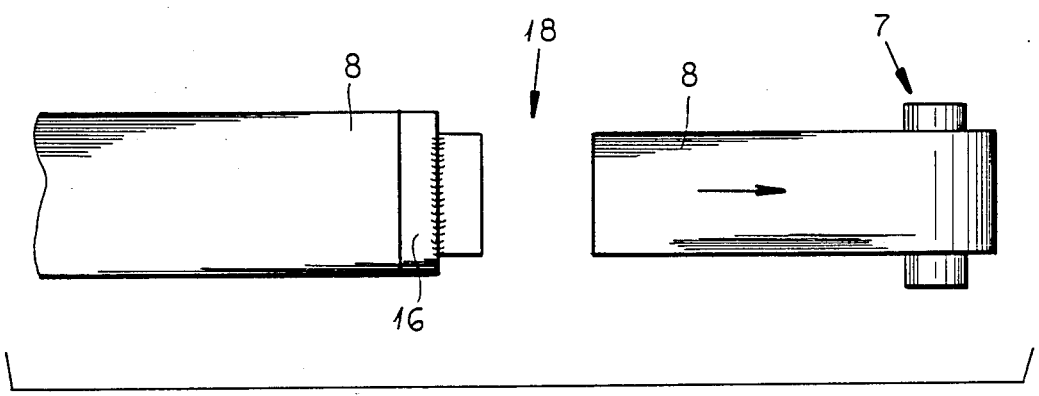
FIG. 3 is a top plan view similar to that in FIG. 2, but indicating the first transverse cut.

Thus, when the edge 19 has been cut by the shear 5 to provide, as it were, a gap 18, see FIGS. 1 and 3, the edge 19 and, consequently, the strip 8 are centered at the strip centering station 12. Next, the lateral trimming shears 9 of the trimming device 6 commence their action in frontal fashion and true and aligned with respect to the lateral sides of the strip 8 at the leading edge 19.

With respect to elapsed time, the time requirements for adjustment of the trimming shears 9 with respect to strip width, knife gap and knife coverage, are in agreement with the coil-replacing period, namely the servicing of the coil. The coil-servicing operation generally includes the positioning of the tongue-shaped strip end 20, contracting of the core of the coiler spool 7, taking down of the respective coil, and the subsequent spreading or expansion of the core of the coiler spool 7.

A set of guide rollers 21 is provided between the trimming device 6 and the coil spool 7.

Figure 4:
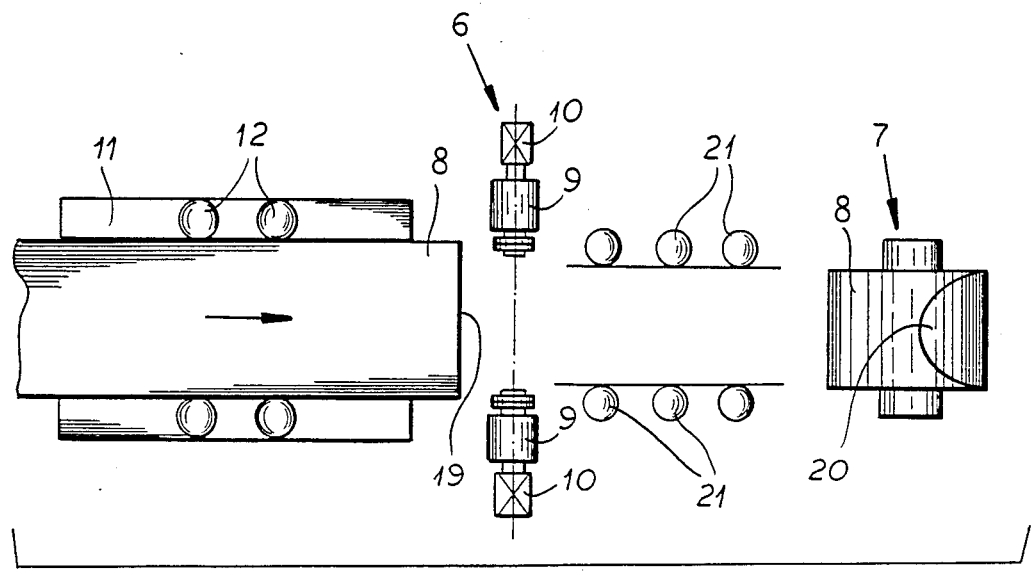
FIG. 4 is a top plan view showing the trimming shears and indicating a coiled strip after the second transverse cut.

In general terms, instead of a straight strip end, one can provide the tongue-shaped end 20 as shown in FIG. 4.

We claim:

1. A method of processing continuous strip—especially metal strip, in a strip-processing line, comprising the steps of:

advancing an oncoming continuous strip with segments of different width along said line;

upon approach of a transition region between segments of different widths to a predetermined location along said line transversely severing the strip to form a severed length of strip from one of said segments and a separation edge on a remaining length of continuous strip with a width different from that of the severed length; and immediately after the transverse severing of the strip, trimming the lateral edges of said remaining length to a new trimmed width different from that of the severed length and while said remaining length is advanced along said line.

2. The method defined in claim 1, further comprising the step of positioning the separation edge upon transverse severing of the strip so that the midpoint of said separation edge is centered with respect to lateral edge trimmers flanking the strip, the trimming of the lateral edges of the remaining length commencing at said separation edge.

* * * * *